United States Patent
Huenlich et al.

(10) Patent No.: US 7,154,882 B1
(45) Date of Patent: Dec. 26, 2006

(54) METHOD OF TRANSMITTING DATA VIA A PACKET-ORIENTED COMMUNICATIONS NETWORK

(75) Inventors: Klaus Huenlich, Neuching (DE); Werner Stoeckl, Baierbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/936,444

(22) PCT Filed: Mar. 10, 2000

(86) PCT No.: PCT/DE00/00761

§ 371 (c)(1),
(2), (4) Date: Sep. 11, 2001

(87) PCT Pub. No.: WO00/54545

PCT Pub. Date: Sep. 14, 2000

(30) Foreign Application Priority Data

Mar. 11, 1999 (DE) .................... 199 10 888

(51) Int. Cl.
H04L 12/64 (2006.01)
(52) U.S. Cl. .................... 370/353; 370/395.6; 370/473
(58) Field of Classification Search ............ 370/395.5, 370/395.51, 395.4, 395.6, 395.61, 395.63, 370/395.64, 395.65, 352, 353, 473, 474
See application file for complete search history.

(56) References Cited

U.S. PATENT DOCUMENTS

| | | | |
|---|---|---|---|
| 5,737,320 A * | 4/1998 | Madonna | 370/258 |
| 5,761,197 A | 6/1998 | Takefman | |
| 6,023,474 A * | 2/2000 | Gardner et al. | 370/467 |
| 6,108,336 A * | 8/2000 | Duault et al. | 370/395.6 |
| 6,226,294 B1 * | 5/2001 | Caves | 370/395.61 |
| 6,289,018 B1 * | 9/2001 | Song | 370/395.6 |
| 6,304,580 B1 * | 10/2001 | Christie et al. | 370/467 |
| 6,470,009 B1 * | 10/2002 | Christie et al. | 370/352 |
| 6,480,494 B1 * | 11/2002 | Hawley | 370/395.61 |

FOREIGN PATENT DOCUMENTS

EP 0 859 533 A1 9/1998

OTHER PUBLICATIONS

G. Geiger et al, "Integrated Circuits for ISDN-status and future". Apr. 1989, IEEE, pp. 190-195.*
XP 000557382 Adaptive Digital Access Protocol: A MAC Protocol for Multiservice Broadband Access Networks, Dail et al., pp. 104-112.

* cited by examiner

Primary Examiner—Hassan Kizou
Assistant Examiner—Habte Mered
(74) Attorney, Agent, or Firm—Bell, Boyd & Lloyd LLC

(57) ABSTRACT

In the present communications system, communications terminals are connected via at least one hub unit and an exchange to a packet-based communications network. A timeslot-oriented data format, which is formed from a periodic sequence of channel-specific information segments, is provided for data transmission between the exchange and the communications terminals. In this case, information segments which are intended for transmission of signaling information, and information segments which are intended for transmission of user data information are transmitted in separate data packets which are intended for data transmission via the packet-oriented communications network.

10 Claims, 4 Drawing Sheets

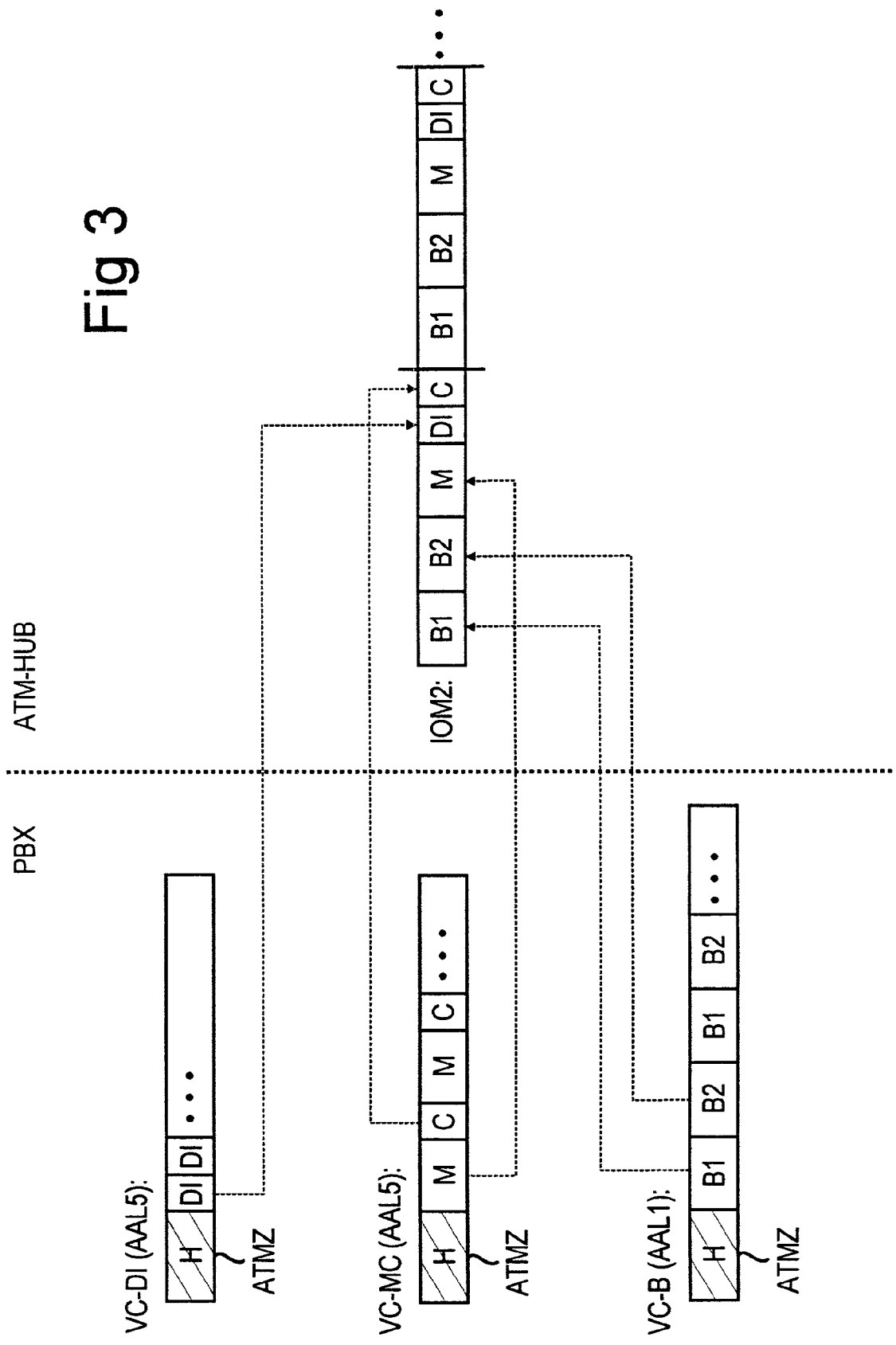

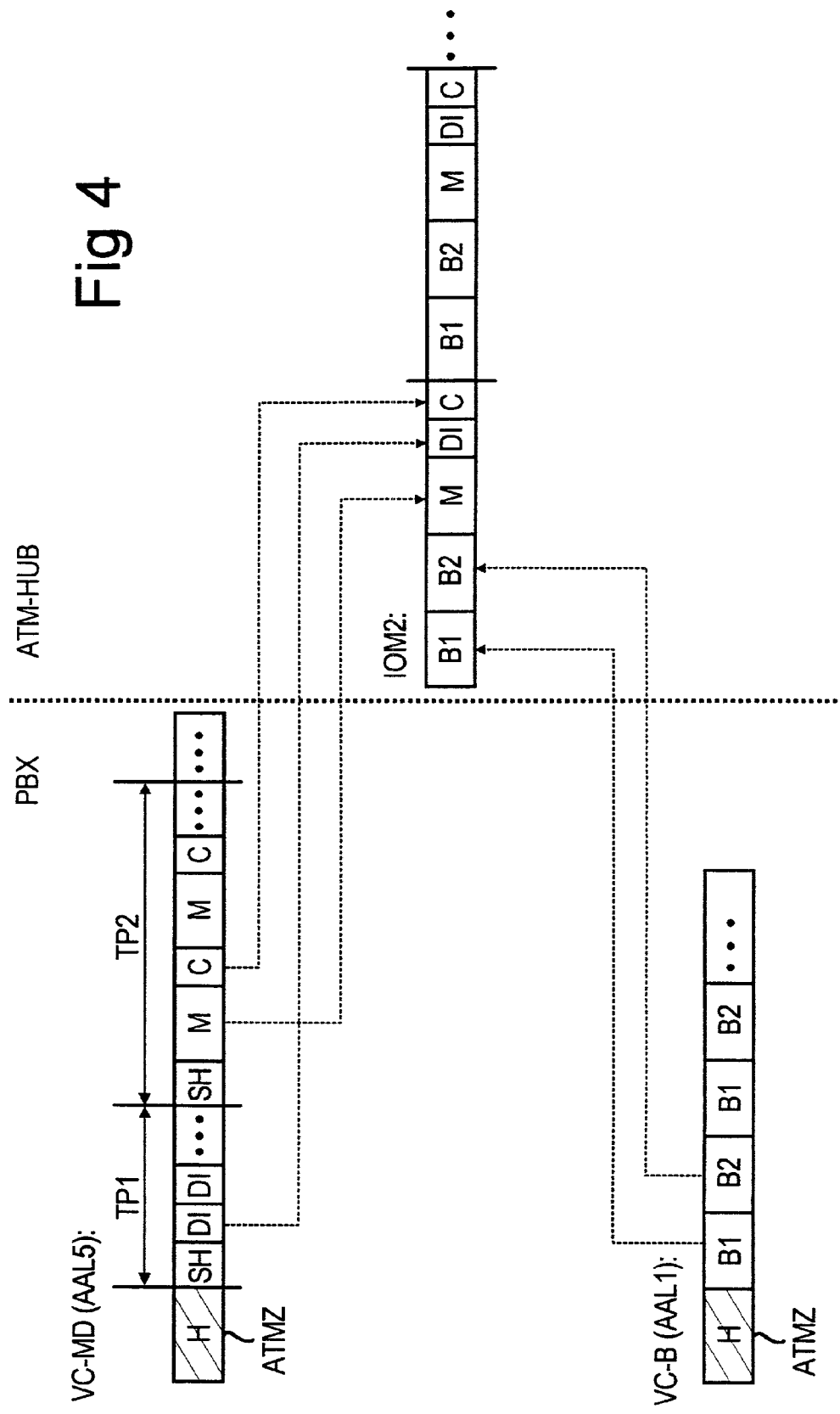

METHOD OF TRANSMITTING DATA VIA A PACKET-ORIENTED COMMUNICATIONS NETWORK

BACKGROUND OF THE INVENTION

The present invention relates to a method for data transmission between the two communications devices via a packet-oriented communications network. In particular, the present invention relates to a transmission system for transmission of timeslot-oriented data between an exchange termination device, frequently referred to as an exchange termination ET, and a line termination LT. According to the terminology of ITU-T Standard G.960 (3/93), "access digital section for ISDN basic rate access" (International Telecommunication Union), in particular pages 2 and 3, the present invention accordingly relates to data transmission at what is referred to as the V-reference point.

A transmission system for transmission of timeslot-oriented data between an exchange termination device and a line termination is normally part of a communications system which has a switching device and subscriber access devices. The subscriber access devices in this case have subscriber interfaces for connection of communications terminals to the communications system. The subscriber access devices are, according to ITU-T Standard G.960, connected via a line termination device and an exchange termination device to the switching device in the communications system. Such a communications system is used to allow narrowband communication connections to be set up and cleared between communications terminals connected to the subscriber access devices, and to allow narrowband communication, for example voice or data communication, between the communications terminals.

In modern communications systems, data transmission between the exchange termination device and the line termination is, in this case, normally carried out on the basis of the IOM-2 (ISDN Oriented Modular Interface) data format, which is formed from a periodic sequence of channel-specific information segments; hereinafter referred to as a time-division multiplex channel. In this case, one time-division multiplex channel is, in each case, generally assigned to each subscriber interface of a subscriber access device.

However, in modern communications technology, there is an increasing requirement for broadband transmission of the information, for example of still images and moving images for video telephone applications, and of large amounts of data for the "Internet". As a consequence, the significance of transmission technologies for high and variable data transmission rates (above 100 Mbps) is rising, which take account not only of the requirements for data transmission (high speed with a variable transmission bit rate) but also of the requirements for voice data transmission (maintenance of time correlation during data transmission via a communications network) in order to allow the separate communications networks which exist for the various purposes at the moment to be integrated in one communications network. One known data transmission method for high data rates is the Asynchronous Transfer Mode (ATM). Data transmission based on the Asynchronous Transfer Mode currently allows a variable transmission rate of up to 622 Mbps.

In the cell-based data transmission method which is known as the Asynchronous Transfer Mode (ATM), data packets of a fixed length, which are referred to as ATM cells, are used for data transport. An ATM cell is composed of a cell header which contains switching data that are relevant for transport for an ATM cell and has a length of five bytes and a 48-byte long payload.

Data transmission via an ATM-based communications network generally takes place within the framework of virtual paths, or virtual channels contained in the virtual paths. To this end, when setting up a connection by interchanging signaling information before the start of the actual user data transmission, connection tables are set up in the respective ATM network nodes in the ATM-based communications network, with switching information including a virtual channel identification and a virtual path identification. In the connection tables, the virtual channel identification is assigned a VCI value, and the virtual path identification is assigned a VPI value. The switching information entered in the connection table in an ATM network node defines how the virtual paths and virtual channels contained in the virtual paths of the incoming and outgoing connections at the ATM network node are associated with one another via the signaling; that is, which input is linked in switching terms to which output of the ATM network node. ATM cells transmitted via these virtual connections (virtual paths and virtual channels) essentially have switching data including a VPI value and a VCI value in the cell header. The ATM cell header data is processed at the input of an ATM network node; that is, the switching data arranged therein is recorded and assessed. The ATM cells are then passed on by the ATM network node, on the basis of the switching information stored in the connection table, to an ATM network node output which represents a specific destination.

The German Patent Application with the official reference 198 45 038.9 has already proposed a transmission system between an exchange termination device and a line termination, in which the data transmission is implemented via an ATM-based communications network. In this case, subscriber interfaces for connection of communications terminals are provided by ATM hub units, as they are referred to in the literature, which are connected to the ATM-based communications network. The exchange termination device in the communications system, and the line termination formed by the ATM hub unit in this case, each have an ATM access unit via which, firstly, a connection to the ATM-based communications network is provided and, secondly, bidirectional conversion is carried out between the timeslot-oriented IOM-2 data format, which is normally provided for data transmission between the exchange termination device and the line termination, and the packet-oriented ATM data format.

The bidirectional conversion between the timeslot-oriented IOM-2 data format and the packet-oriented ATM data format is, in this case, carried out on the basis of two different conversion modes. According to the first conversion mode, based on the CES 2.0 Standard from ATM forum, the timeslot-oriented data is packed in bytes into ATM cells in accordance with the first ATM adaptation layer AAL1. The ATM adaptation layer AAL is, in this case, used for matching the ATM data format (which corresponds to layer 2 in the OSI reference model) to the network layer (layer 3) in the OSI reference model (Open System Interconnection). In the second conversion mode, the timeslot-oriented data is packed in bytes into ATM cells which are sub-structured in accordance with the second ATM adaptation layer AAL2.

Furthermore, German Laid-Open Specification DE 196 04 245 A1 likewise discloses a method for data transmission between two communications devices via a packet-oriented communications network, with the timeslot-oriented IOM-2 data format being used for data transmission between the communications devices. In this case, the information segments are transmitted communications network.

A method for data transmission between two communications devices via a packet-oriented communications network is likewise known from Dail J. E. et al.: "Adaptive Digital Access Protocol: A MAC Protocol for Multiservice Broadband Access Networks" IEEE Communications Magazine, US, IEEE Service Center, Piscataway, N.Y., Volume 34, No. 3, Mar. 1, 1996, XP000557382 ISSN: 0163-6804, in particular on pages 104–112, in which signaling information is transmitted in first data packets, and user information is transmitted in second data packets, via the packet oriented communications network.

The present invention is directed toward specifying an alternative method via which bidirectional data transmission can take place between the communications terminals and the exchange.

SUMMARY OF THE INVENTION

In order to allow better understanding of the method of operation of the transmission of timeslot-oriented data between an exchange termination device and a line termination, it appears to be necessary, first of all, to explain the known principles once again, in more detail.

Transmission of timeslot-oriented data between the exchange termination device and the line termination normally takes place on the basis of the IOM-2 data format which is known, for example, from the product document "ICs for Communications—IOM®-2 Interface Reference Guide" from Siemens Munich, 3/91, Order No. B115-H6397-X-X-7600, in particular pages 6 to 12.

FIG. 1, which shows a schematic illustration of the IOM-2 data format is intended to allow the relationships to be understood more quickly, on the basis of which time-division multiplex frames IOM-R are transmitted periodically, with a length of 125 µs. Such a time-division multiplex frame IOM-R is subdivided into time-division multiplex channels or subframes CH0, . . . ,CH7, frequently referred to in the literature just as a "channel". The subframes CH0, . . . ,CH7 are, in turn, each subdivided into two 8-bit long user data channels B1, B2, into an 8-bit long monitor channel M, into a 2-bit long signaling channel DI, into a 4-bit long status channel C/I (Command/Indicate) via two monitor status channels MR, MX, which each have a length of 1 bit. The signaling channel DI, the status channel C/I and the two monitor status channels MR, MX are normally referred to in summarized form in the literature as the control channel D.

User data information is transmitted via the user data channels B1, B2 between devices connected to an IOM-2 bus at a transmission bit rate of 64 kbps, in each case. Control information associated with the transmission of user data information is transmitted via the signaling channel DI at a transmission bit rate of 16 kbps. The monitor channel is used, inter alia, for configuration of devices connected to an IOM-2 bus, based on an "IOM-2 bus master". The monitor status channels MR (Monitor Read) and MX (Monitor Transmit) are, in this case, used to define whether data is read by the IOM-2 bus from a device connected to the IOM-2 bus (MR=1, MX 0), or is emitted to the IOM-2 bus (MR=0, MX=1). Information relating to real time requirements that apply to data transmission between the two devices connected to an IOM-2 bus is interchanged via the status channel C/I.

Only one constant transmission bit rate can be provided between the exchange and an ATM hub unit for data transmission via an ATM-based communications network via ATM cells in accordance with the first ATM adaptation layer AAL1 since, irrespective of whether data is or is not actually being transmitted, all the channel information (information for the two user data channels B1, B2, for the monitor channel M and for the control channel D) must be transmitted using the IOM-2 data format. On the other hand, a variable transmission bit rate can be provided between the exchange and an ATM hub unit for data transmission via the ATM-based communications network via ATM cells in accordance with the second ATM adaptation layer AAL2, since it is possible to transmit only individual channel information items, transmitting up-to-date data. Modules which provide bidirectional conversion between a timeslot-oriented IOM-2 data format and the ATM data format in accordance with the second ATM adaptation layer AAL2 cannot, however, be used economically at the moment, for cost reasons.

A major advantage of the method according to the present invention is now that the method can be implemented in a simple manner in already-existing systems without having to carry out any changes to the interface between the exchange and the ATM hub unit –referred to as the V-reference point in accordance with the terminology used in ITU-T Standard G.960.

A further advantage of the method according to the present invention is that the transmission of the information segments which are intended for transmission of signaling information, this corresponding to the data transmitted using the signaling channel in the IOM-2 data format, and of the information segments which are intended for transmission of user data information, this corresponding to the data transmitted via the user data channels in the IOM-2 data format, in separate data cells allows for user data information to be transmitted via the packet-oriented communications network only in situations in which user data actually need to be transmitted in the information segments intended for this purpose.

One advantage of the refinements of an embodiment of the present invention is, inter alia, that already existing AAL5 modules can be used economically for data transmission via the ATM-based communications network via ATM cells in accordance with the fifth ATM adaptation layer AAL5, so that no new developments are required.

Additional features and advantages of the present invention are described in, and will be apparent from, the following Detailed Description of the Invention and the Figures.

BRIEF DESCRIPTION OF THE FIGURES

FIG. 3 shows a structogram schematically illustrating the virtual channels which are set up in accordance with a first transmission mode for data transmission via an ATM-based communications network.

FIG. 4 shows a structogram schematically illustrating the virtual channels which are set up in accordance with a second transmission mode for data transmission via the ATM-based communications network.

DETAILED DESCRIPTION OF THE INVENTION

Figure 1:
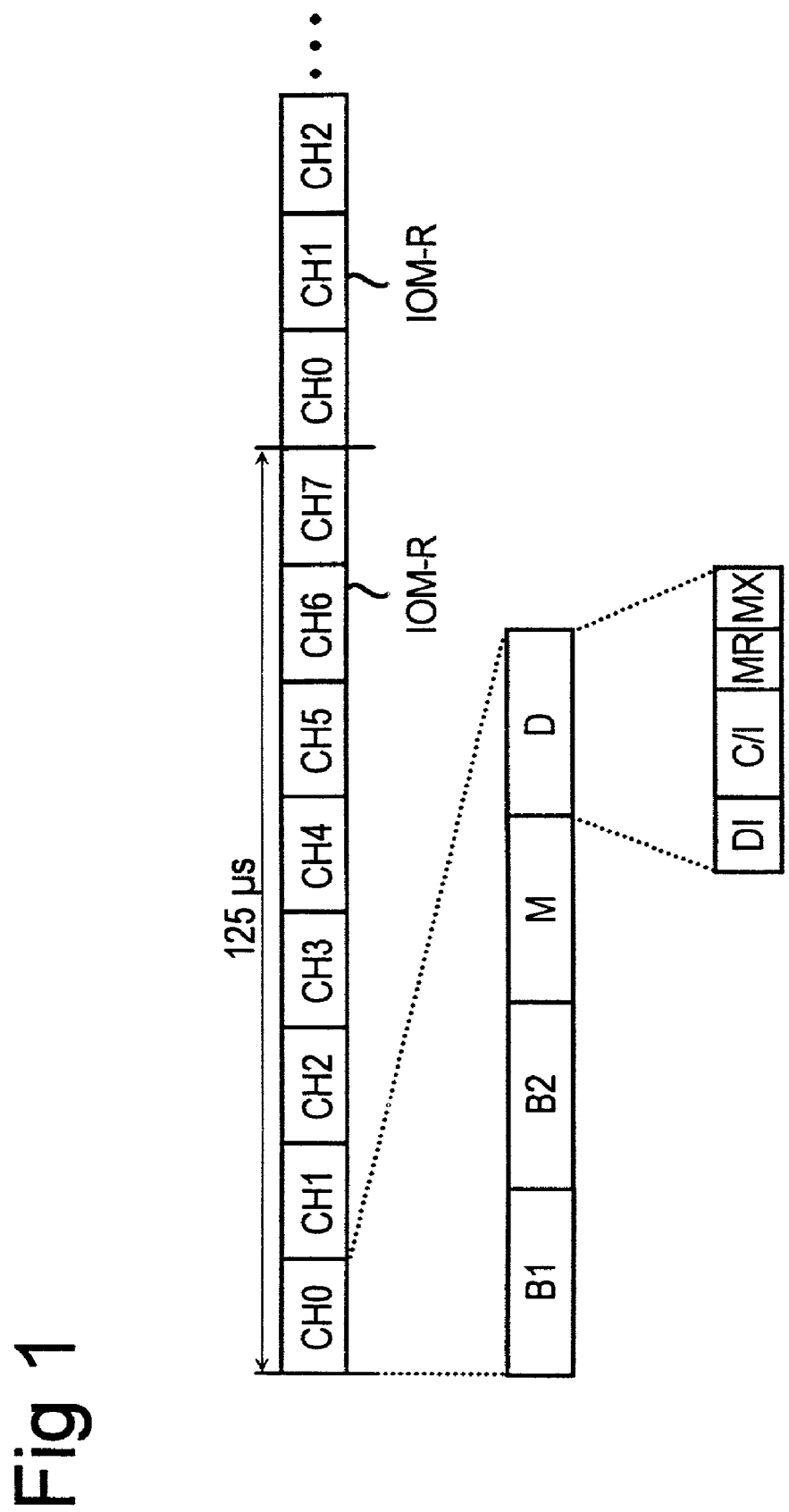
FIG. 1 shows a schematic illustration of the IOM-2 data format.
Figure 2:
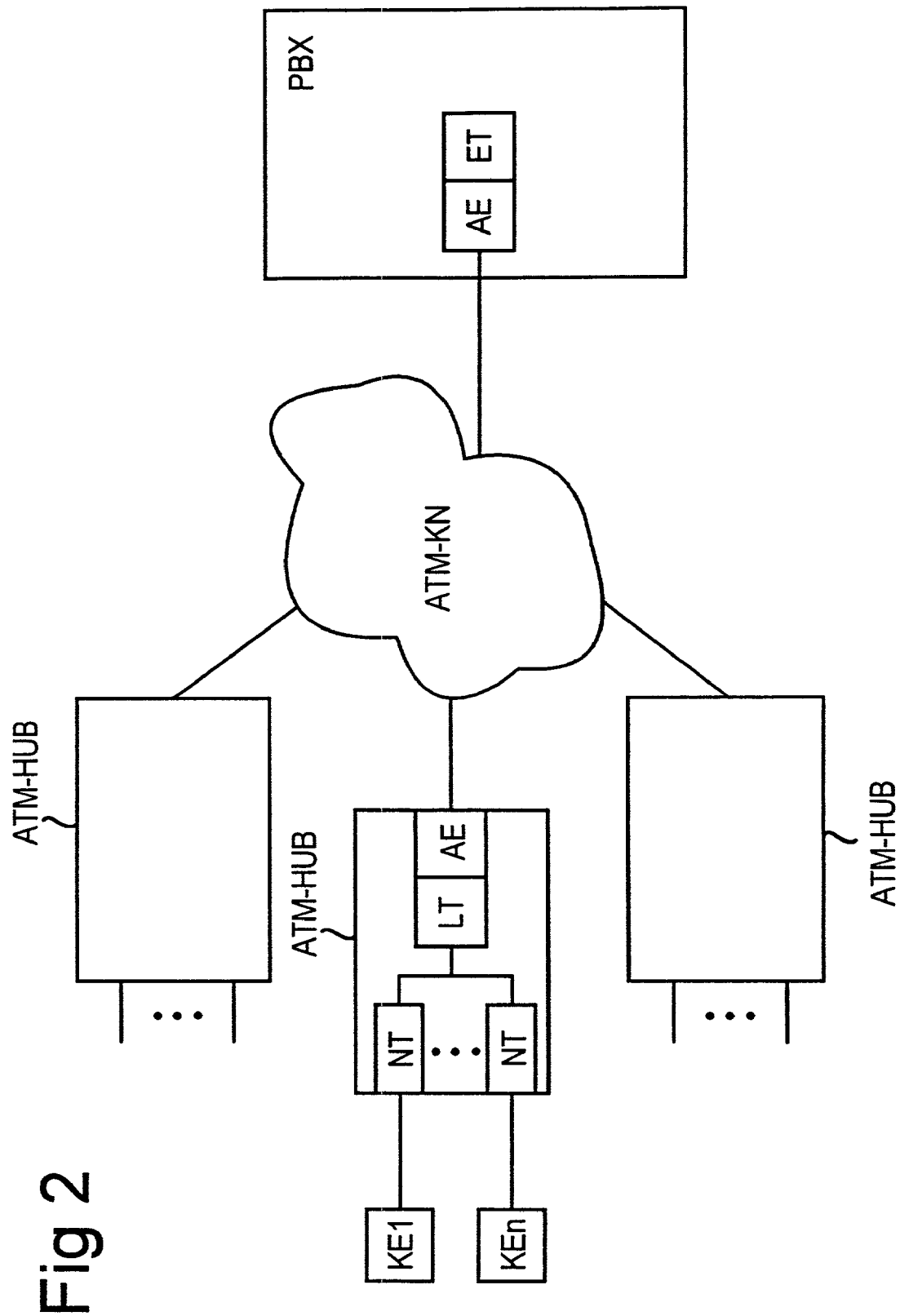
FIG. 2 shows a structogram schematically illustrating the major function of units involved in the method according to the present invention.

FIG. 2 shows a schematic illustration of an exchange PBX (Private Branch Exchange) having an exchange termination unit ET (Exchange Termination) arranged in it. The exchange termination unit ET is connected to an ATM-based communications network ATM-KN via an access unit AE. Furthermore, ATM hub units ATM-HUB are connected to the ATM-based communications network ATM-KN and have subscriber interfaces for connection of communications terminals to the ATM-based communications network ATM-KN. Communications terminals KE1, . . . ,KEn are illustrated by way of example.

ISDN communications terminals (Integrated Services Digital Network) are normally connected to the ATM-based communications network ATM-KN via an ATM hub unit ATM-HUB, or digital communications terminals are normally connected to the ATM-based communications network ATM-KN via interfaces derived from this, $U_{po}$ interfaces. In general, a $U_{po}$ or $S_0$ interface includes, firstly, two user data channels which are configured as ISDN-oriented B-channels each having a transmission base rate of 64 kbps and, secondly, a signaling channel which is configured as an ISDN-oriented D-channel with a transmission bit rate of 16 kbps. Furthermore, in general, analog communications terminals, for example a facsimile terminal can be connected to the ATM-based communications network ATM-KN via a/b interfaces.

The communications terminals KE1, . . . ,KEn are connected to the ATM hub unit ATM-HUB, that is to say the subscriber interfaces are provided, by the ATM hub unit ATM-HUB in accordance with the terminology in ITU-T Standard G.960 via network terminations NT (Network Termination). According to ITU-T Standard G.960 (International Telecommunication Union), the network terminations NT on an ATM hub unit ATM-HUB are connected via a line termination LT, which is arranged in the ATM hub unit ATM-HUB, to the exchange termination device ET in the exchange PBX. For data transmission via the ATM-based communications network ATM-KN, the line termination LT is connected, in a corresponding manner to the exchange termination device ET in the exchange PBX, via an access unit AE to the ATM-based communications network ATM-KN.

Data can be transmitted via the ATM-based communications network ATM-KN using two different transmission modes which will be described in more detail in the following text.

FIG. 3 shows a schematic illustration of the virtual connections which are set up for data transmission via the ATM-based communications network ATM-KN, frequently referred to as a virtual connection VC in the literature, using the first transmission mode. When data is transmitted via the ATM-based communications network ATM-KN using the first transmission mode, the signaling information which is provided by a signaling unit (not illustrated) in the exchange PBX, in a corresponding way to the data to be transmitted within the signaling channel DI when using the IOM-2 data format, is transmitted via the ATM-based communications network ATM-KN using a virtual connection VC-DI provided exclusively for this purpose. The virtual connection VC-DI may, in this case, be a connection set up at that time for the transmission of signaling information or, alternatively, a permanent connection set up in the ATM-based communications network ATM-KN at an administratively predefined transmission bit rate of, for example, 16 kbps between the exchange PBX and the ATM hub unit ATM-HUB.

Signaling information is transmitted via the virtual connection VC-DI via ATM cells ATMZ using the fifth ATM adaptation layer AAL5. An ATM cell ATMZ is in general composed of a cell header H, as it is frequently referred to in the literature, which has a length of 5 bytes and contains switching data relevant for the transport of an ATM cell ATMZ, and a payload field, as it is frequently referred to in the literature, with a length of 48 bytes. The use of ATM cells ATMZ in accordance with the fifth ATM adaptation layer AAL5 for transmission of signaling information allows a variable transmission bit rate to be used between the exchange PBX and the ATM hub unit ATM-HUB via the ATM-based communications network ATM-KN. The ATM adaptation layer AAL (ATM Adaptation Layer) is, in this case, used for matching the ATM cell format (layer 2 of the OSI reference model) to the network layer (layer 3) of the OSI reference model (Open System Interconnection).

Transmission of the signaling information via a virtual connection VC-DI at a variable transmission bit rate also requires that, in situations in which the signaling information is transmitted via a permanent connection, which is set up in the ATM-based communications network ATM-KN between the exchange PBX and the ATM hub unit ATM-HUB, transmission resources are taken from the ATM-based communications network ATM-KN only when signaling information is actually being transmitted via the ATM-based communications network ATM-KN.

The IOM-2 data-format-specific information which is provided by a control unit (not illustrated) in the exchange PBX (in a corresponding manner to the data to be transmitted within the monitor channel M, the status channel C/I and the monitor status channels MR, MX in the IOM-2 data format) is transmitted in an analogous manner to the signaling information via the ATM-based communications network ATM-KN using a virtual connection VC-MC which is provided exclusively for this purpose. To assist clarity, the information to be transmitted within the status channel C/I and the monitor status channels MR, MX using the IOM-2 data format is combined, for short, by the designation C in FIG. 3. IOM-2 data-format-specific information is likewise transmitted via the virtual connection VC-MC via ATM cells ATMZ in accordance with the fifth ATM adaptation layer AAL5.

The user data information, in a corresponding manner to that within the user channels B1, B2 in the IOM-2 data format, for data to be transmitted is transmitted via a virtual connection VC-B via ATM cells ATMZ in accordance with the first ATM adaptation layer AAL1. In this case, depending on the bandwidth required for the communications terminals KE1, . . . ,KEn which are connected to an ATM hub unit ATM-HUB, user data information for only one user data channel or for a number of user data channels can, in this case, be transmitted in combined form via the virtual connection VC-B. In this way, transmission bit rates of integer multiples of 64 kbps can be provided via the virtual connection VC-B. By way of example, in FIG. 3, user data information for two user data channels B1, B2 is being transmitted via the virtual connection VC-B and a transmission bit rate, resulting from this, of 128 kbps.

The data transmitted within the virtual connections VC-DI, VC-MC, VC-B is inserted into the IOM-2 data stream in the ATM hub unit ATM-HUB as shown in FIG. 3. When no data is actually being transmitted, corresponding blank data is inserted in the IOM-2 data stream. Data originating from the ATM hub unit ATM-HUB is transmitted to the exchange PBX in an analogous manner to the described method, but in the opposite direction.

FIG. 4 shows a schematic illustration of the virtual connections which are set up using the second transmission mode for data transmission via the ATM-based communications network ATM-KN. When transmitting data via the ATM-based communications network ATM-KN using the second transmission mode, the signaling information which is provided by the signaling unit in the exchange PBX, in a corresponding manner to the data to be transmitted within the signaling channel DI in the IOM-2 data format, and the IOM-2 data-format-specific information which is provided by the control unit in the exchange PBX, in a corresponding manner to the data to be transmitted within the monitor channel M, the status channel C/I and the monitor status channels MR, MX in the IOM-2 data format, are transmitted jointly via the ATM-based communications network ATM-KN, via ATM cells ATMZ in accordance with the fifth adaptation layer AAL5, using a virtual connection VC-MD which is provided exclusively for this purpose. The virtual connection VC-MD can, in this case, once again be a connection which is set up at the time for transmission of this information or, alternatively, a fixed connection which is set up in the ATM-based communications network ATM-KN, and has an administratively predetermined transmission bit rate of, for example, 128 kbps between the exchange PBX and the ATM hub unit ATM-HUB.

Within the fifth ATM adaptation layer AAL5, the user data area of an ATM cell ATMZ can be subdivided into packet elements TP1, TP2. In the exemplary embodiment above, the signaling information is transmitted in a first packet element TP1, and the IOM-2 data-format-specific information is transmitted in a second packet element TP2. The packet elements TP1, TP2 each have a packet element header SH which essentially has a length identification (not illustrated) which defines the number of data bytes transmitted in the respective packet element.

The user data information, in a corresponding manner to the data to be transmitted within the user data channels B1, B2 in the IOM-2 data format, is transmitted in an analogous manner to the first transmission mode via a virtual connection VC-B via ATM cells ATMZ in accordance with the first ATM adaptation layer AAL1.

The data transmitted within the virtual connections VC-MD, VC-B is inserted into the IOM-2 data stream in the ATM hub unit ATM-HUB, as illustrated in FIG. 4. When no data is actually being transmitted, blank data is inserted into the IOM-2 data stream in a corresponding manner. Data originating from the ATM hub unit ATM-HUB is transmitted to the exchange PBX in an analogous manner to the described method, but in the opposite direction.

The separate transmission of the signaling information and the user data information via the ATM-based communications network ATM-KN allow for transmission resources for transmission of user data information which is to be transmitted within a connection via the ATM-based communications network ATM-KN to be taken from the ATM-based communications network ATM-KN only when user data is actually being transmitted. Thus, for example, in a first step in the setting up of a connection, only the signaling information required for setting up the connection and the IOM-2 data-format-specific information are transmitted via the ATM-based communications network ATM-KN, and the user data information which is actually to be transmitted is then transmitted once this has been done.

Although the present invention has been described with reference to specific embodiments, those with skill in the art will recognize that changes may be made thereto without departing from the spirit and scope of the invention as set forth in the hereafter appended claims.

The invention claimed is:

1. A method for data transmission between communications devices via a packet-oriented communications network, a method comprising the steps of:
   providing a time-slot oriented data format, formed from a periodic sequence of channel-specific information segments, for data transmission between the communications devices, the data format having information segments for transmitting signaling information, information segments for transmitting user data information, and information segments for transmitting data-format-specific information;
   transmitting the information segments intended for transmitting the signaling information in first data packets which are intended for data transmission via the packet-oriented communications network;
   transmitting the information segments intended for transmitting the user data information in second information segments which are intended for data transmission via the packet-oriented communications network; and
   transmitting the information segments intended for transmitting the data-format-specific information in third data packets that are intended for data transmission via the packet-oriented communications network.

2. A method for data transmission between communications devices via a packet-oriented communications network as claimed in claim 1, wherein the information segments intended for transmitting the data-format-specific information and the information segments intended for transmitting the signaling information are transmitted jointly in the first data packets.

3. A method for data transmission between communications devices via a packet-oriented communications network as claimed in claim 2, the method further comprising the step of:
   subdividing the first data packets into at least two packet elements, the second information segments being transmitted in the first packet element, and the information segments intended for transmitting the signaling information being transmitted in the second packet element.

4. A method for data transmission between communications devices via a packet-oriented communications network as claimed in claim 3, wherein each of the first and second packet elements have a cell header with a length identification, the length identification defining a number of data items transmitted in the respective packet element.

5. A method for data transmission between communications devices via a packet-oriented communications network as claimed in claim 1, wherein the timeslot-oriented data format is the standardized IOM-2 data format.

6. A method for data transmission between communications devices via a packet-oriented communications network as claimed in claim 1, wherein the data transmission via the packet-oriented communications network takes place on the basis of the ATM data format.

7. A method for data transmission between communications devices via a packet-oriented communications network as claimed in claim 6, wherein the information segments intended for transmitting the signaling information are transmitted via the packet-oriented communications network in data packets designed in accordance with the fifth ATM adaptation layer agreement.

8. A method for data transmission between communications devices via a packet-oriented communications network as claimed in claim 6, wherein the information segments intended for transmitting the user data information are transmitted via the packet-oriented communications network in data packets designed in accordance with the first ATM adaptation layer agreement.

9. A method for data transmission between communications devices via a packet-oriented communications network as claimed in claim 1, wherein the information segments intended for transmitting the signaling information are transmitted via an existing tie line in the packet-oriented communications network.

10. A method for data transmission between communications devices via a packet-oriented communications network as claimed in claim 1, wherein the information segments intended for transmitting the signaling information are transmitted via a packet-oriented communications network using a connection which is set up, specifically for this data transmission, between the communications devices.

* * * * *